(No Model.)
C. S. PUSEY.
CULINARY OR EGG BEATER.
No. 372,043. Patented Oct. 25, 1887.
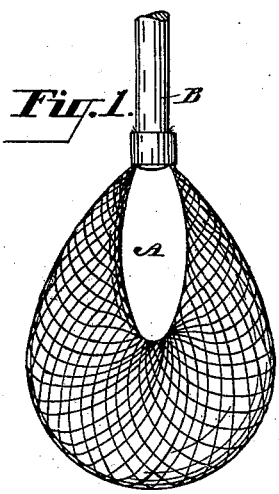
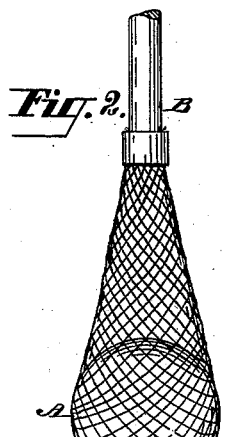
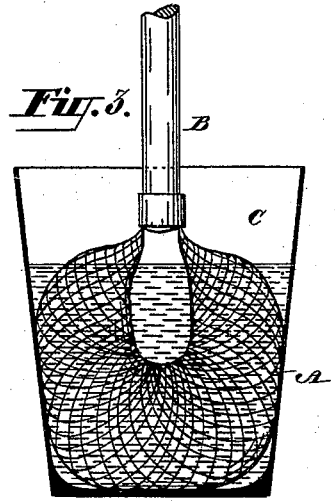
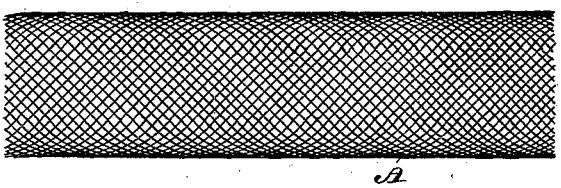
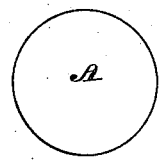
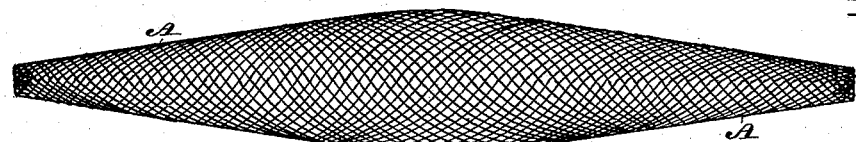
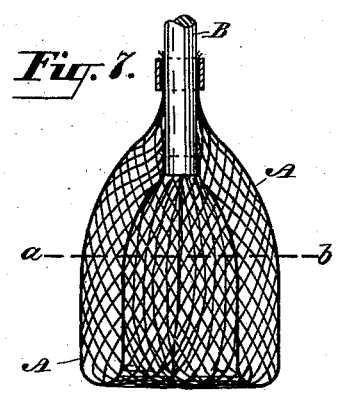
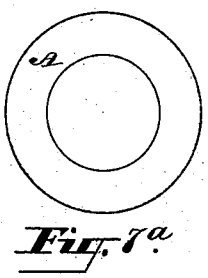
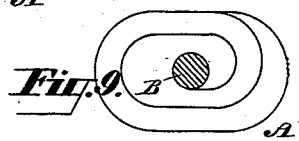
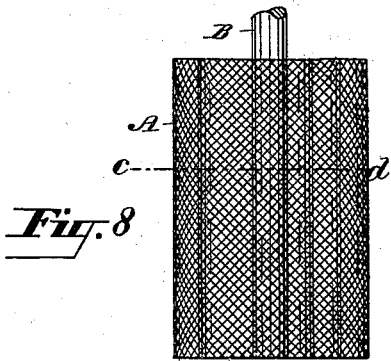
WITNESSES:
INVENTOR
Caroline S. Pusey
per Joshua Pusey
Attorney.

UNITED STATES PATENT OFFICE.

CAROLINE S. PUSEY, OF PHILADELPHIA, PENNSYLVANIA.

CULINARY OR EGG BEATER.

SPECIFICATION forming part of Letters Patent No. 372,043, dated October 25, 1887.

Application filed July 26, 1887. Serial No. 245,295. (No model.)

*To all whom it may concern:*

Be it known that I, CAROLINE S. PUSEY, a citizen of the United States, residing at the city and county of Philadelphia, and State of Pennsylvania, have invented certain new and useful Improvements in Culinary or Egg Beaters, of which the following is a full, clear, and exact description, reference being had to the accompanying drawings, of which—

Figure 1 is a side elevation; Fig. 2, an edge elevation; Fig. 3, the device in a vessel as in use; Fig. 4, a side elevation of a braided wire tube of which the beater is constructed; Fig. 5, an end view thereof; Fig. 6, the said tube with the ends gathered or bunched; Fig. 7, a modification of the form of the beater; Fig. 7ª, a section as on line $a\,b$, Fig. 7; Fig. 8, a second modification thereof; Fig. 9, a section as on line $c\,d$, Fig. 8.

The nature of this invention is a culinary or egg beater (also a churn) constructed of elastic wires braided or interwoven to form a fabric, preferably of tubular form, which fabric is attached to a suitable handle or spindle for operating the same.

In carrying out my invention in the best, simplest, and cheapest manner that has occurred to me, I form a round or more or less fattened tube, A, Fig. 4, of fine steel wires, by braiding or interweaving the same by means of well-known mechanism. I prefer to have the normal mesh of the fabric about one-fourth of an inch, more or less.

I bunch together the ends of the wires at each extremity of said tube, thereby giving to the latter a double tapering form, as shown in Fig. 6. I then secure in any suitable manner the gathered ends to a spindle or handle, B, as seen in Figs. 1, 2, and 3, and the device is ready for use, as follows: The beater is placed in a cup or other suitable vessel, C, Fig. 3, containing the egg or other article to be beaten, whipped, or churned, and the spindle is rapidly twirled back and forth between the palms of the hands, which causes the wire fabric to rotate in the material. This effects the desired beating, whipping, or churning. The braided wire fabric being quite flexible in all directions, it may accommodate itself to the size and form of the vessel C, while the numerous fine wires, passing in a multitude of various paths through the egg, &c., perform the requisite beating with surprising rapidity and perfection.

The spindle B may be connected to well-known or suitable mechanism or gearing operated by a crank or otherwise for multiplying the speed of rotation.

The beater is easily cleansed by striking it against the top of the vessel or by removing it from the vessel, and after taking out the beaten material, rinsing it (the beater) and rotating the same rapidly within the vessel, when the centrifugal force will effect the cleansing, the material readily loosening its hold and falling into the vessel.

My beater may also be made by taking the tube A, Fig. 4, and introverting one end thereof, as shown in the front view, Fig. 7, and in the horizontal section, Fig. 7ª, the ends being secured to the spindle or handle B, as seen. It may also be made of a strip of interwoven or braided wire, A, Figs. 8 and 9, one end of which is secured to the spindle B, then curling the fabric into the oblong form shown in the latter figure, (9,) and fastening the other end to the outer curve of the fabric. The form of the invention that is recommended is, however, that first hereinbefore described.

Having thus described my invention, I claim as new and wish to secure by Letters Patent—

1. A culinary beater, whipper, or churn constructed of a fabric of interwoven or interbraided elastic wire attached to a suitable device for operating the same, substantially as and for the purpose set forth.

2. A culinary beater, whipper, or churn composed of a tubular fabric of elastic interbraided or interwoven wires, and attached to a spindle or other suitable device for operating the same, substantially as and for the purpose set forth.

3. A culinary beater, whipper, or churn consisting of a tube of interwoven or interbraided wires having its ends turned up and secured to a spindle or other suitable device for imparting motion to said tube, substantially as and for the purpose set forth.

In testimony whereof I have hereunto affixed my signature this 23d day of July, A. D. 1887.

CAROLINE S. PUSEY.

Witnesses:
GRACE EDNA PUSEY,
W. W. DOUGHERTY.